US005245153A

United States Patent [19]

Singer et al.

[11] Patent Number: 5,245,153

[45] Date of Patent: Sep. 14, 1993

[54] DEPOSITING METAL ONTO A SURFACE

[75] Inventors: Alfred R. E. Singer; Gordon I. Davies, both of Swansea; Allen D. Roche, Aberdare, all of Great Britain

[73] Assignee: Ford Motor Company, Dearborn, Mich.

[21] Appl. No.: 721,553

[22] PCT Filed: Jan. 12, 1990

[86] PCT No.: PCT/GB90/00046

§ 371 Date: Oct. 7, 1991

§ 102(e) Date: Oct. 7, 1991

[87] PCT Pub. No.: WO90/08203

PCT Pub. Date: Jul. 26, 1990

[30] Foreign Application Priority Data

Jan. 14, 1989 [GB] United Kingdom ................. 8900809

[51] Int. Cl.[5] ................ B23K 9/04

[52] U.S. Cl. ................ 219/76.15

[58] Field of Search ................ 219/76.14, 76.15

[56] References Cited

U.S. PATENT DOCUMENTS

| | | | |
|---|---|---|---|
| 2,982,845 | 5/1961 | Yenni et al. . | |
| 2,998,922 | 9/1961 | Gibson | 219/76.15 |
| 3,013,528 | 12/1961 | Bland . | |
| 3,064,114 | 11/1962 | Cresswell et al. | 219/76.15 |
| 4,019,011 | 4/1977 | Cape | 219/76.15 |
| 4,160,895 | 7/1979 | Hopper | 219/76.14 |
| 4,547,391 | 10/1985 | Jenkins | 219/76.15 |

FOREIGN PATENT DOCUMENTS

| | | |
|---|---|---|
| 8701176 | 2/1988 | Belgium . |
| 0271032 | 12/1987 | European Pat. Off. . |
| 821225 | 10/1959 | United Kingdom . |
| 845410 | 8/1960 | United Kingdom . |
| 877095 | 9/1961 | United Kingdom . |
| 959027 | 5/1964 | United Kingdom . |
| 2111864 | 7/1983 | United Kingdom . |
| 2141443 | 12/1984 | United Kingdom . |

*Primary Examiner*—Clifford C. Shaw
*Attorney, Agent, or Firm*—Joseph W. Malleck; Roger L. May

[57] ABSTRACT

In order to deposit metal onto a surface such as a cylindrical surface, an arc spraying method is used with a consumable electrode (16), a non-consumable electrode (18) and a jet of atomising gas (22) blown through the arc (20) in a radial direction to propel the molten metal of the consumable electrode from the acr to the cylinder wall (12). The non-consumable electrode and the atomising gas jet both rotate about the cylinder axis so that the entire surface can be covered. The supply for the consumable electrode will normally come from a reel which can be stationary such that the consumable electrode does not rotate about its own axis.

16 Claims, 4 Drawing Sheets

DEPOSITING METAL ONTO A SURFACE

BACKGROUND OF THE INVENTION

1. Technical Field

This invention relates to the deposition of metal onto a surface using a spraying process. The invention is especially useful in spraying onto internal cylindrical surfaces, and a typical example of such a surface is the internal surface of an internal combustion engine cylinder. The invention is however equally applicable to other cylindrical bores and to other surfaces.

2. Description of the Prior Art

Both plasma spray and arc spray processes are known for depositing metal onto a surface. The plasma spray process uses a powder feed, whereas in the arc spray process the material to be deposited is supplied in the form of wire. Plasma deposition has the advantage of a hot, short flame giving high molten particle velocities and dense deposits but arc spray equipment has the advantages that it is cheaper than plasma and that the rate of deposition is higher.

For use in the coating of cylindrical surfaces, arc spray would be the method of choice, but there are formidable difficulties in designing a rotating twin-wire spray gun for cylindrical surfaces because of the need to rotate two heavy spools of feed wire each occupying a large amount of space. This is particularly complicated when the cylinder bores of a combustion engine are to be coated, because in this application it is desirable to be able to simultaneously coat a number of adjacent, parallel, cylindrical bores.

SUMMARY OF THE INVENTION

According to the invention, there is provided a method of depositing metal onto a surface using an arc spraying process with a consumable electrode and a non-consumable electrode, characterised in that the surface is an internal cylindrical surface, the non-consumable electrode rotates about a first axis, the consumable electrode is fed in a direction generally parallel to the first axis but does not rotate about its own axis, an arc is struck between the electrodes and atomising gas is directed through the arc at an angle to the first axis to atomise molten metal in the arc and to carry it towards and deposit it on the surface.

The non-consumable electrode preferably describes a circle when it rotates about the first axis and the consumable electrode can be fed axially within the circle described by the non-consumable electrode.

The consumable electrode is moved in an axial direction as it is consumed. Apart from this axial movement, the consumable electrode can either describe a circle about the first axis, or can lie at all times on the first axis. Whichever alternative is used however, it is important to note that the consumable electrode will not rotate about its own axis.

In a preferred embodiment, the non-consumable electrode rotates about the consumable electrode, and the consumable electrode lies on the first axis whilst the non-consumable electrode rotates around the first axis.

An additive can be introduced into the atomised molten metal before the atomised metal is deposited on the surface.

The invention also provides apparatus for depositing metal onto a surface using an arc spraying process, the apparatus comprising a consumable electrode and a non-consumable electrode, characterised in that the surface is an internal cylindrical surface and the non-consumable electrode is mounted for rotation about a first axis, the apparatus also including a feed mechanism for feeding the consumable electrode in a direction generally parallel to the first axis, means for striking an arc between the electrodes and means for directing atomising gas through the arc at an angle to the first axis towards the surface.

The non-consumable electrode is preferably of tungsten, is water-cooled at its base and is shrouded by an inert gas. The electrode can be mounted in a head and directed towards the centre of the surface, the head being mounted for rotation such that the electrode maintains its direction towards the centre as it rotates. The head can include gas passages for directing the atomising gas through the arc towards the surface.

The apparatus may include means for feeding particulate material into the atomised metal before the metal is deposited on the surface, and the head may include passages for directing a gas with entrained particulate additives towards the surface.

Both electrodes can be axially movable relative to the cylindrical surface.

DETAILED DESCRIPTION AND BEST MODE

The wire for the consumable electrode does not rotate about its own axis and can be drawn from a stationary spool.

The invention will now be further described, by way of example, with reference to the accompanying drawings, in which.

Figure 2:
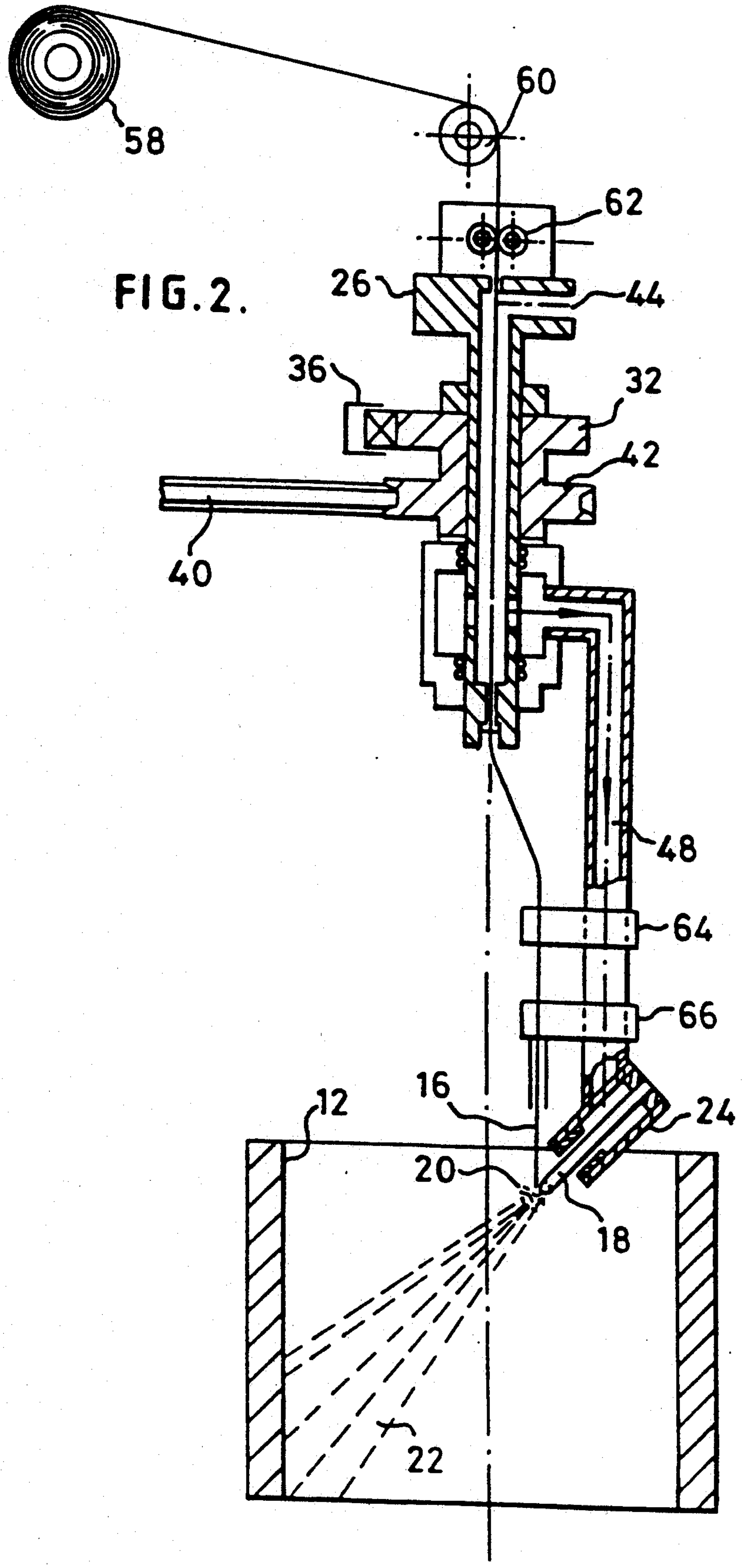
FIG. 2 is a cross sectional view of a second embodiment of arc spraying apparatus in accordance with the invention.
Figure 2A:
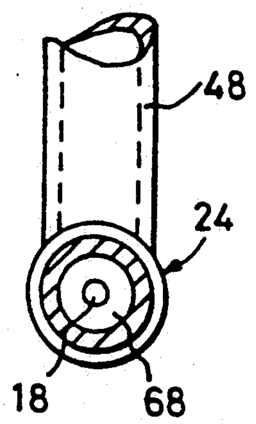

FIG. 2*a* is an enlarged view of the spraying head from FIG. 2; and

FIGS. 3, 4, 5 and 6 are schematic views illustrating further alternative embodiments of the invention.

Figure 1:
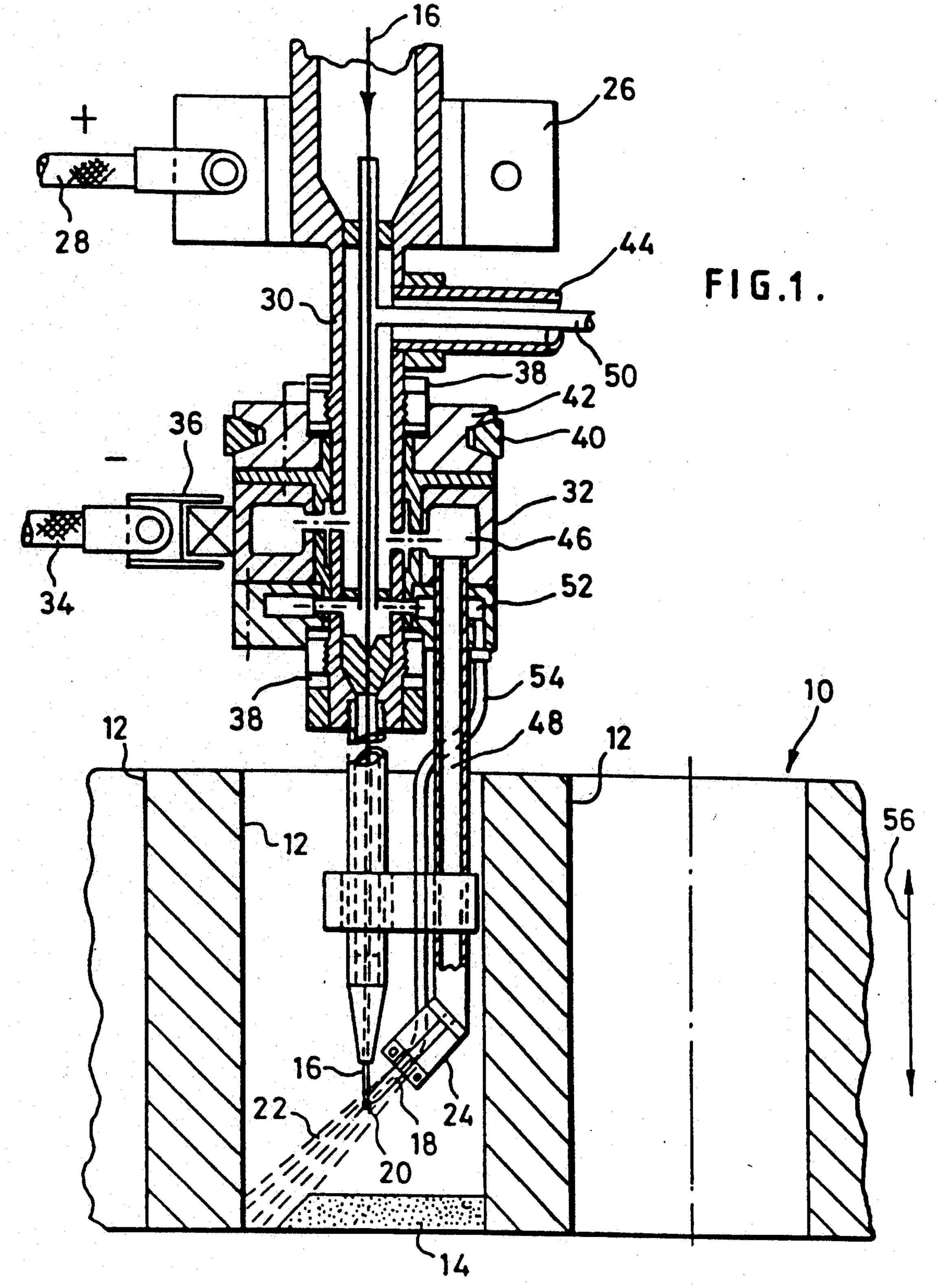
FIG. 1 is a cross sectional view of arc spraying apparatus in accordance with the invention in use in spraying a cylinder bore.

FIG. 1 shows a cylinder block 10 of an internal combustion engine with three parallel, cylinder bores 12. It is desired to coat the internal cylindrical walls of these bores with a sprayed metal coating 14. The coating may be purely metallic, or may include particulate additions which can be non-metallic.

In FIG. 1, a spraying apparatus in accordance with the invention is shown in position in the middle bore of the three bores 12. The apparatus has a central consumable electrode 16 in the form of a wire which is fed along the axis of the cylinder from a wire supply reel which is not shown in FIG. 1 but will be described with reference to FIG. 2. The apparatus also has a non-consumable electrode 18 which can be made of tungsten or of another suitable high melting point conductive material. An arc 20 is struck between the two electrodes and a stream 22 of atomising gas is directed through the arc and towards the wall of the bore 12 so as to transport molten metal from the arc to the cylinder wall where it is deposited and where it solidifies.

To achieve a uniform distribution of sprayed metal on the cylinder bore, the non-consumable electrode 18 is mounted in a head 24 which rotates around the consumable electrode 16, the consumable electrode in this embodiment being mounted on the axis.

Looking at the mechanism of FIG. 1 in detail, the apparatus has a fixed support 26 connected to the positive terminal of a suitable supply of electric current through a conductor cable 28. The support 26 includes a guide tube 30 which is positioned so that it extends coaxially with the axis of the bore 12 being sprayed. The head 24 carrying the tungsten electrode 18 is mounted on a rotary support 32 which surrounds the tube 30 and is connected to the negative terminal of a source of current through a conductor cable 34 and suitable brush gear 36. The body 32 is provided with rotary seals 38 at top and bottom which seal the rotary support relative to the fixed support but allow rotation to take place. The rotary support is driven by a belt drive with a belt 40 running in a pulley 42 which forms part of the rotary support.

The head 24 which carries the tungsten electrode has an arrangement for cooling and shrouding the electrode, is fed with electric current, with atomising gas and optionally with particulate material which is to be incorporated into the sprayed coating. The atomising gas is introduced through a pipe 44, passes down the centre of the tubular shaft 30 and then radially outwardly into an annular chamber 46 in the rotary support 40. The chamber 46 is between the rotary seals 38. From the chamber 46, the gas passes along a pipe 48 to the head 24 and the head 24 is constructed so that the atomising gas is emitted in a spray pattern as illustrated in the Figure. The atomising gas will be used under pressure to produce the desired spray pattern, and typically the atomising gas pressure can be 120 p.s.i. (8.5 bar). The pipe 48 also acts as a support for the head 24 and is supported against the guide tube 30 by electrically insulating guides 64 and 66 which permit the pipe 48 to rotate about the tube 30.

The tungsten electrode can be water-cooled or gas-cooled or cooled by a combination of water and gas. For example the base of the electrode may be water-cooled and the shaft of the electrode can be surrounded with a shroud of cold, inert gas. It is also important to protect the electrode against oxidation, and the shrouding gas performs this function. Argon is the preferred gas although other inert or non-oxidising gases or gas mixtures may be used.

Argon can be used both for shrouding and atomising. However Argon is expensive, and in some circumstances it is possible to use a cheaper gas such as nitrogen to provide the atomising function. Gas mixtures can also be considered. An argon/helium mixture or a nitrogen/hydrogen mixture could be used to promote arc stability or atomising efficiency. It may be possible to use nitrogen with some other constituent as the shrouding and atomising gas.

Furthermore a gas flow is also required to propel any particulate material to be introduced into the coating. The particles may be picked up by the atomising gas flow, or may be propelled by a separate gas feed.

Particulate material to be incorporated into the sprayed metal coating is supplied through an auxiliary tube 50 which surrounds the consumable wire electrode 16, and which extends radially outwardly to a separate annular chamber 52. From the chamber 52, a transport pipe 54 leads to the head 24 and is arranged so that the particulate material is dispersed in the spray 22. The particulate material which may be in the form of powder particles, chopped fibres or whiskers will also be supplied under pressure, which in this case is about 20 p.s.i (2 bar). The particulate material may be fluidised in a gas stream of its own when it is fed to the head.

In use, the apparatus will be positioned as shown in FIG. 1 and an arc 20 will be struck between the electrodes 16 and 18. The atomising gas will be directed through the arc to deposit molten metal and any additional particles onto the wall of the cylinder. As this takes place, the rotary support 32 will be driven in rotation so that the head 24 rotates about the consumable electrode 16 to spray the entire circumference of the cylinder wall. The consumable electrode will be fed into the arc as the electrode is consumed. Together with the rotation of the head about the axis, the entire apparatus will have a component of movement parallel to the cylinder axis as indicated by the double headed arrow 56, so that the entire internal surface of the bore can be coated.

It may be found convenient to have a fixed position for the wire spool 58, in which case the movement of the spraying head and the feed wire in a direction parallel to the axis of the cylinder would be taken up by allowing a degree of slackness in the wire 16 between the spool and the knurled rollers 62.

When a number of adjacent bores are to be coated, a multihead apparatus can be used which extends simultaneously into the adjacent bores and is operated to coat the bores at the same time.

FIG. 2 shows an alternative arrangement where parts corresponding to those shown in FIG. 1 carry the same reference numerals. In this embodiment, a spool 58 containing the consumable electrode is mounted at a fixed location and the wire electrode 16 is drawn off around a pulley 60 and through a pair of rotating knurled rollers 62. The knurled rollers grip the wire and feed it through the apparatus to the arc.

In this Figure, the arc is struck at a position offset from the cylinder axis. It will be noted however that the fixed support 26 and the rotating support 32 are both mounted coaxially with the cylinder axis, but that the consumable electrode 16 is drawn off from the apparatus along a final path offset from the axis. The use of this offset of the arc from the cylinder axis allows a longer spray distance to be obtained which can be of advantage. The consumable electrode 16 will be fed through guides 64 and 66 but will pass freely through apertures in these guides so that as the rotary support 32 rotates about the axis, the wire will not rotate about its own axis. The wire spool is fixed in position. The guides 64 and 66 will be of an insulating nature because both the wire consumable electrodes 16 and the support tube 48 for the head 24 will be carrying electric current to the arc.

FIG. 2*a* shows the end of the head 24 with the tungsten electrode 18 mounted centrally and surrounded by an annular gap 68 through which the atomising gas is emitted. This gap will be designed so that the necessary spray pattern is produced as the gas passes through it.

Figure 3:
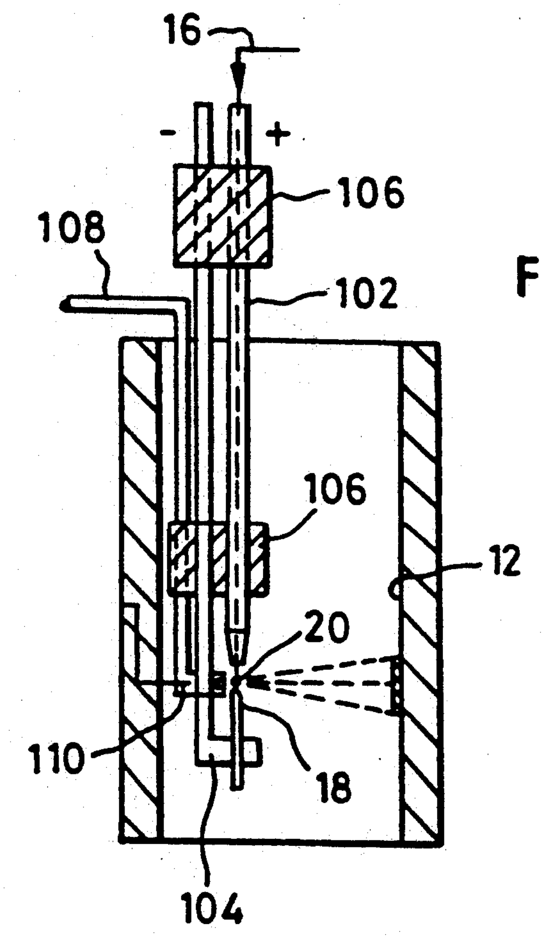

In the embodiment of FIG. 3, the atomising gas feed is separated from the holder for the tungsten electrode 18. The consumable wire electrode 16 is fed along a tube 102 The non-consumable tungsten electrode 18 is supported on a support 104 which runs parallel to the tube 102 and is supported against the tube 102 by two insulating blocks 106. The two electrodes 16 and 18 are coaxial and an arc 20 is formed between them. Atomising gas is fed through a pipe 108 to a nozzle 110 opposite the arc 20 so as to spray molten metal from the arc against the wall of the cylinder 12. The electric current supplied to the arc is indicated by + and − signs.

Figure 4:
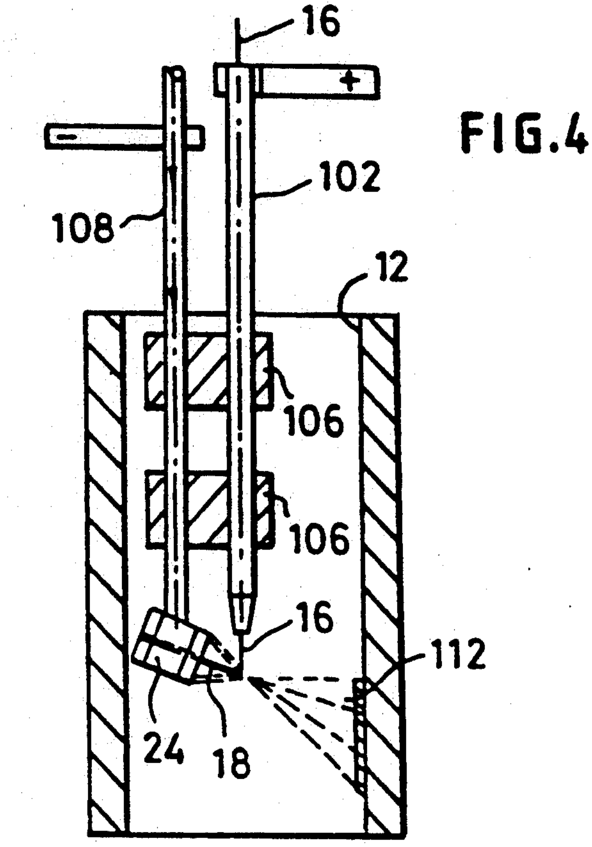

FIG. 4 shows an arrangement similar to FIG. 1, but where the atomising gas is directed from the head 24 in a converging pattern which converges to a point at the arc 20 and then diverges on the other side of the arc so as to form a diffused spray pattern 112 on the cylinder wall 12.

Figure 5:
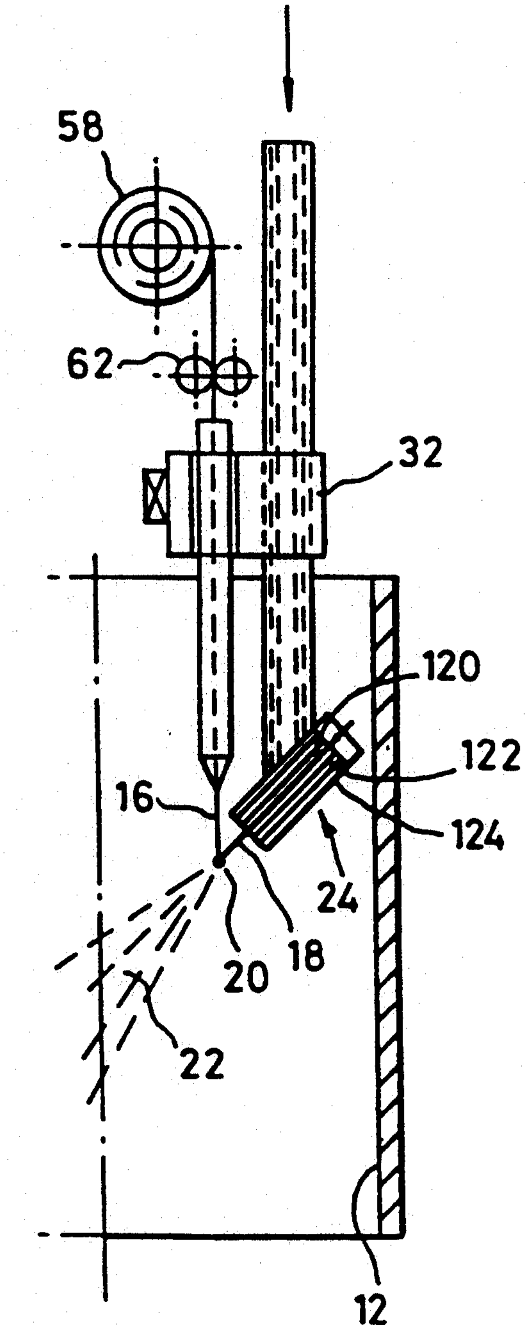

FIG. 5 illustrates multi-channel heads 24. In this Figure, a central annular passage 120 can carry the shielding or shrouding gas; particulate material can be carried through a radially outer ring 122, and the atomising gas can be carried in the radially outermost ring 124. The particles in the ring 122 may be already entrained by their own gas, or they may flow through this ring until they are picked up by the atomising gas from the ring 124.

Figure 6:
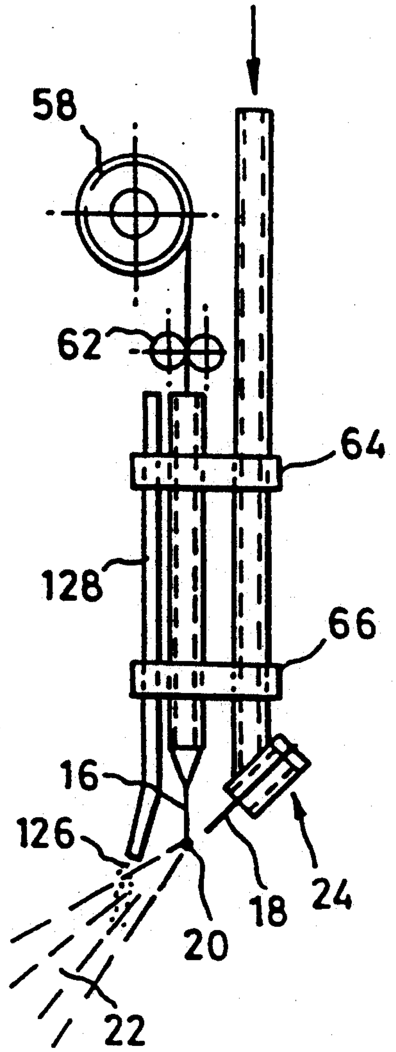

FIG. 6 illustrates an alternative feed for particulate material 126. In this Figure a separate pipe 128 feeds the particulate material to the spray pattern 22 downstream of the arc 20 and the particulate material is then picked up by the spray and deposited with the metal on the cylinder wall. Where the particulate material is intrinsically soluble in the matrix metal, it is essential to ensure that the added particles do not reach such a high temperature that they dissolve in the matrix before the matrix solidifies. One way of preventing this happening is to use a cold or a cool atomising gas to atomise the molten matrix metal so that the added particles are surrounded by cool gas during flight and therefore are encapsulated in the matrix during spray deposition, with the minimum of solution taking place.

It is advantageous if the tip of the consumable electrode 16 is consumed and cooled uniformly from all sides so that a symmetrical shape of the melted wire tip is obtained. This can be achieved by rotating the non-consumable electrode around the axis of the consumable electrode as will occur for example in FIGS. 1 and 2.

We claim:

1. A method of annularly thermal spraying a material onto an internal cylindrical surface of a narrow cavity having a geometrical first axis, using an arc spraying process with a consumable electrode and a non-consumable electrode, wherein the non-consumable electrode rotates about a second axis as well as linearly adjusts along such second axis, said second axis being parallel to said first axis, the consumable electrode is fed into and maintained in arc striking distance from the non-consumable electrode, an arc is struck between the electrodes, and atomising gas is directed through the arc and across said first axis to atomise molten material in the arc and to carry it towards and deposit it on the surface.

2. A method as claimed in claim 1, wherein said atomizing gas is directed along the non-consumable electrode, and (ii) the non-consumable electrode describes a circle when it rotates about the first axis and the consumable electrode is fed axially into the interior of the circle described by the non-consumable electrode.

3. A method as claimed in claim 1, wherein the non-consumable electrode rotates about the consumable electrode and forms an included angle with said consumable electrode of 45° or 180°.

4. A method as claimed in claim 1, wherein the consumable electrode lies on the first axis whilst the non-consumable electrode rotates around the first axis.

5. A method as claimed in claim 1, wherein an additive is introduced into the atomised molten metal before the atomised metal is deposited on the surface.

6. The method as in claim 1, in which said narrow cavity is a cylinder bore of an internal combustion engine block.

7. Apparatus for thermally spraying a material onto an internal cylindrical surface of a narrow cavity having a geometrical first axis using an arc spraying process, the apparatus comprising a consumable electrode, a non-consumable electrode, means mounting the non-consumable electrode for rotation about a second axis as well as linearly adjustable along said second axis, said second axis being parallel to said first axis, a feed mechanism for feeding the consumable electrode in a direction generally parallel to the first axis but without rotation about its own axis, means for striking and maintaining an arc between the electrodes, and means for directing atomising gas through the arc and across said first axis to carry molten material toward and deposit on said surface.

8. Apparatus as claimed in claim 7, wherein the non-consumable electrode is mounted for rotation about the consumable electrode.

9. Apparatus as claimed in claim 7, wherein the non-consumable electrode describes a circle as it rotates about the first axis, and the feed mechanism feeds the consumable electrode within the circle.

10. Apparatus as claimed claim 7, wherein the non-consumable electrode is of tungsten.

11. Apparatus as claimed in claim 7, wherein the non-consumable electrode is mounted in a head and is directed towards the first axis of the surface, the head being mounted for rotation such that the electrode maintains its direction towards the first axis as it rotates, and the atomizing gas being directed along the non-consumable electrode to reduce stray arcing and enhance inherent ionization of the gas by the arc.

12. Apparatus as claimed in claim 11 wherein the head includes gas passages for directing the atomising gas through the arc towards the surface.

13. Apparatus as claimed claim 7 including means for feeding particulate material into the atomised metal before the metal is deposited on the surface.

14. Apparatus as claimed in claim 13 wherein the head also includes passages for directing a gas with entrained particulate additives towards the surface.

15. Apparatus as claimed in claim 7, wherein both electrodes are axially movable relative to the surface.

16. Apparatus as claimed in claim 15, wherein the wire for the consumable electrode is drawn from a stationary spool.

* * * * *